(12) United States Patent
Roberts et al.

(10) Patent No.: US 8,503,754 B2
(45) Date of Patent: Aug. 6, 2013

(54) PARALLEL PROCESS FOR LEVEL SET SEGMENTATION OF VOLUME DATA

(75) Inventors: Mike Roberts, Calgary (CA); Mario Costa Sousa, Calgary (CA); Joseph Ross Mitchell, Calgary (CA)

(73) Assignee: Calgary Scientific Inc. (CA)

( * ) Notice: Subject to any disclaimer, the term of this patent is extended or adjusted under 35 U.S.C. 154(b) by 238 days.

(21) Appl. No.: 13/153,907

(22) Filed: Jun. 6, 2011

(65) Prior Publication Data

US 2011/0299745 A1 Dec. 8, 2011

Related U.S. Application Data

(60) Provisional application No. 61/344,187, filed on Jun. 7, 2010.

(51) Int. Cl.
*G06K 9/00* (2006.01)

(52) U.S. Cl.
USPC .......................................................... 382/131

(58) Field of Classification Search
USPC .................. 382/100, 128–134; 128/920–925; 356/39–49; 600/407–414, 424–426; 345/581–618; 250/455
See application file for complete search history.

(56) References Cited

U.S. PATENT DOCUMENTS

2005/0100220 A1* 5/2005 Keaton et al. ................. 382/191

\* cited by examiner

*Primary Examiner* — Atiba O Fitzpatrick
(74) *Attorney, Agent, or Firm* — Meunier Carlin & Curfman, LLC

(57) ABSTRACT

A parallelized sparse field method for segmenting a volume dataset is provided. Using a processor a level set field within a multi-dimensional dataset comprising a plurality of voxels is initialized in parallel operation. The multi-dimensional dataset is indicative of an object. An initial set of active voxels is then generated in parallel operation in dependence upon the initialized level set field. New active voxels are determined in parallel operation. Duplicate active voxels are then removed in parallel operation, followed by compacting the active voxels in parallel operation. The process is repeated until a quantitative stopping criterion is met and level set segmentation data indicative of a feature of the object are determined in dependence upon the level set field.

20 Claims, 14 Drawing Sheets

PARALLEL PROCESS FOR LEVEL SET SEGMENTATION OF VOLUME DATA

FIELD OF THE INVENTION

The instant invention relates to segmentation of volume datasets and in particular to a parallelized level set volume segmentation method for segmenting volume datasets.

BACKGROUND

Modern hospitals utilize medical images from a variety of imaging devices such as, for example, a Computer Tomography (CT) scanner or a Magnetic Resonance Imaging (MRI) scanner producing volume datasets. Segmentation of volume datasets is an important task in medical diagnostics. Manual segmentation of large volume datasets is a slow process requiring expert knowledge in pathology and anatomy.

The results of computer-assisted techniques—for example, seeded region growing—are often highly variable when the Region Of Interest (ROI) is heterogeneous, making it difficult to segment lesions—for example, brain tumors—which have variable intensity, texture, shape, and size.

Computer-assisted level set segmentation techniques reduce the variability of difficult segmentation tasks. The level set segmentation is highly flexible since it depends on intrinsic factors—such as curvature of the segmented regions—and extrinsic factors—such as intensity or texture of the image. However, the flexibility of the level set segmentation results in high computational costs—long computation time and large memory requirements.

Two distinct processes for more efficiently determining the level set field update have been disclosed recently. The first is the narrow band process—disclosed in Adalsteinson D, Sethian J A "*A Fast Level Set Method for Propagating Interfaces*", Journal of Computational Physics 8(2), pp. 269-277, 1995—where field updates are only determined on a narrow band of elements around an implicitly defined level set surface. Several processes for segmenting volume datasets have been implemented using the narrow band process. These processes use Graphics Processing Unit (GPU) virtual memory paging techniques for mapping the irregular and dynamic narrow band onto a physically contiguous domain suited for parallel computation on the GPU. A disadvantage of the narrow band process is that the entire computational domain—volume dataset—is frequently traversed in order to update the narrow band as the surface is deformed. The performance of GPU based narrow band processes is limited due to per-frame communication latency between the GPU and the Central Processing Unit (CPU), since the CPU is used for updating the narrow band, which has been only recently overcome by traversing the domain of active tiles in parallel on the GPU as disclosed in Jeong W-K, Beyer J, Hadwiger M, Vazquez A, Pfister H, and Whitaker R T "*Scalable and Interactive Segmentation and Visualization of Neural Processes in EM datasets*", IEEE Transactions on Visualization and Computer Graphics 15, 6, pp. 1505-1514, 2009.

The second process is the sparse field process—disclosed in Whitaker, R "*A Level Set Approach to 3D Reconstruction from Range Data*", International Journal of Computer Vision 29(3), pp. 203-231, 1998, and in Peng, D, Merriman, B, Osher, S, Zhao, H, and Kang, M "*A PDE Based Fast Local Level Set Method*", Journal of Computational Physics 155(2), pp. 410-438, 1999. In contrast to the narrow band process the sparse field process incrementally updates a linked list of active elements at each time step. The sparse field process avoids traversing the entire computational domain except during initialization. Unfortunately, due to the reliance on linked lists state-of-the-art sparse field processes are ill-suited for parallel processing and are performed in a sequential fashion.

It is desirable to provide a parallelized sparse field level set method for segmenting a volume dataset.

SUMMARY OF EMBODIMENTS OF THE INVENTION

In accordance with an embodiment of the present invention there is provided a method comprising:
a) using a processor initializing in parallel operation a level set field within a multi-dimensional dataset comprising a plurality of voxels, the multi-dimensional dataset being indicative of an object;
b) using the processor generating in parallel operation an initial set of active voxels in dependence upon the initialized level set field;
c) using the processor determining in parallel operation new active voxels;
d) using the processor removing in parallel operation duplicate active voxels;
e) using the processor compacting in parallel operation the non-duplicate active voxels;
f) using the processor repeating c) to e) until a quantitative stopping criterion is met;
g) using the processor determining level set segmentation data in dependence upon the level set field, the segmentation data being indicative of a feature of the object; and,
h) using the processor providing the level set segmentation data.

In accordance with an embodiment of the present invention there is further provided a method comprising:
a) using a processor initializing in parallel operation a level set field within a multi-dimensional dataset comprising a plurality of voxels, the multi-dimensional dataset being indicative of an object;
b) using the processor generating in parallel operation an initial set of active voxels in dependence upon the initialized level set field;
c) using the processor determining in parallel operation new active voxels corresponding to an intersection of active voxels changing in time and active voxels changing in space;
d) using the processor removing in parallel operation duplicate active voxels;
e) using the processor compacting in parallel operation the non-duplicate active voxels;
f) using the processor repeating c) to e) until a quantitative stopping criterion is met;
g) using the processor determining level set segmentation data in dependence upon the level set field, the segmentation data being indicative of a feature of the object; and,
h) using the processor providing the level set segmentation data; and
wherein steps b) to f) the active voxels are stored in a plurality of auxiliary buffers.

In accordance with an embodiment of the present invention there is yet further provided a storage medium having stored therein executable commands for execution on a processor, the processor when executing the commands performing:
a) initializing in parallel operation a level set field within a multi-dimensional dataset comprising a plurality of voxels, the multi-dimensional dataset being indicative of an object;

b) generating in parallel operation an initial set of active voxels in dependence upon the initialized level set field;
c) determining in parallel operation new active voxels;
d) removing in parallel operation duplicate active voxels;
e) compacting in parallel operation the non-duplicate active voxels;
f) repeating c) to e) until a quantitative stopping criterion is met;
g) determining level set segmentation data in dependence upon the level set field, the segmentation data being indicative of a feature of the object; and,
h) providing the level set segmentation data.

BRIEF DESCRIPTION OF THE DRAWINGS

Exemplary embodiments of the invention will now be described in conjunction with the following drawings, in which.

DETAILED DESCRIPTION OF THE INVENTION

Figure 1:
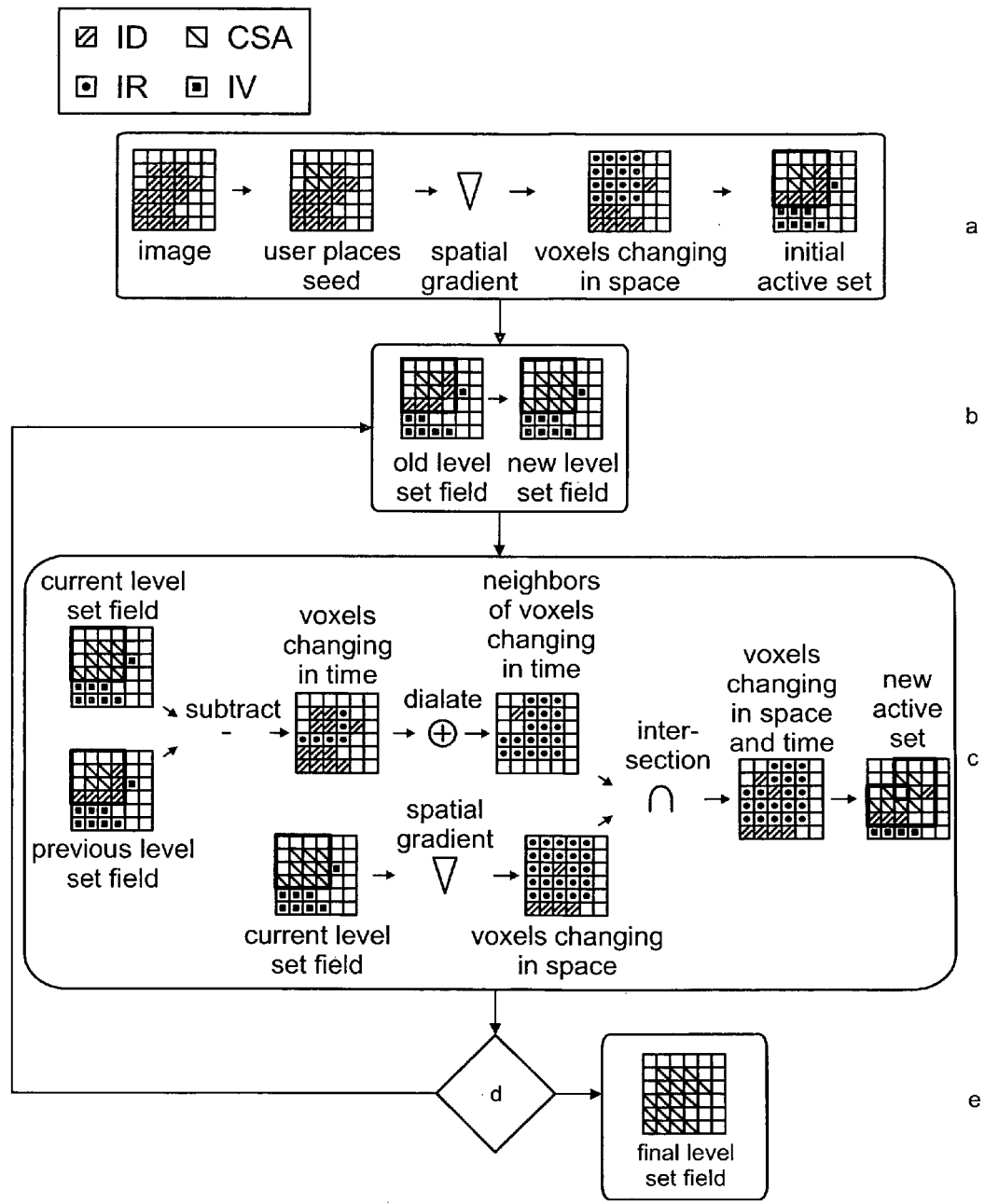
FIG. 1 is a simplified flow diagram illustrating a sparse field level set segmentation method according to an embodiment of the invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

While the description of embodiments herein below is with reference to segmentation of volume datasets generated in medical imaging, it will become evident to those skilled in the art that the embodiments of the invention are not limited thereto, but are also applicable for segmentation of volume datasets generated in various different applications such as, for example, visualization of various 3D measurement data, as well as numerical simulation data, in engineering and science. Furthermore, the embodiments of the invention are not limited to volume datasets, but are also applicable for segmentation of other multi-dimensional datasets such as, for example, 2D and 4D datasets.

In the level set method for image segmentation an implicitly represented seed surface is embedded within a volume dataset—with the volume dataset being indicative of an object such as, for example, a patient's organs—and then iteratively deformed to envelop nearby anatomical ROIs. Each surface point is deformed along a path normal to the local surface. An application-specific speed function F(x,t) is used to determine the local rate of surface motion, where x indicates a voxel in the image volume dataset and t indicates a time instant of the segmentation process. In the sparse field level set segmentation method according to an embodiment of the invention a speed function determining the surface speed using the mean surface curvature and the underlying intensity of the image is employed, but as is evident to those skilled in the art is not limited thereto and various other types of speed functions are employable. Speed functions of this type are disclosed, for example, in:

Lefohn A E, Cates J E, Whitaker R E "*Interactive, GPU-Based Level Sets for 3D Segmentation*", MICCAI, pp. 564-572, 2003; and, Lefohn A E, Kniss J A, Hansen, Whitaker R E "*Interactive Deformation and Visualization of Level Set Surfaces Using Graphics Hardware*", IEEE Visualization 2003, pp. 75-82, 2003.

By taking into account the level set surface's curvature, the surface is prevented from leaking into inappropriate regions across weak, incidental connections at ROI boundaries. For the scalar field $\phi(x,t): \Re^4 \to \Re$, the level set surface is defined as $S(t)=\{x|\phi(x,t)=0\}$. As in the references cited herein above, the term of the speed function is defined $D(x)=\epsilon-|I(x)-T|$ as a function of the image intensity $I(x)$, the user-specified target intensity T—preferably, the target intensity is specified such that it encourages the level set surface to grow the most—and a user-specified intensity window parameter $\epsilon$ within which the level set surface is encouraged to grow. If $I(x)$ is between $T-\epsilon$ and $T+\epsilon$, then $D(x)$ encourages surface growth, otherwise $D(x)$ encourages surface contraction. The curvature term of the speed function is defined as $$C(x,t) = \nabla \cdot \frac{\nabla \phi(x, t-\Delta t)}{|\nabla \phi(x, t-\Delta t)|}, \text{ where } \nabla \cdot \frac{\nabla \phi(x, t-\Delta t)}{|\nabla \phi(x, t-\Delta t)|}$$

is the mean surface curvature of the level set field from the previous iteration. The curvature term encourages a smooth surface by preferentially contracting the surface in regions with high mean curvature. The speed function is then defined as $F(x,t)=\alpha C(x,t)+(1-\alpha)D(x)$ where $\alpha \in [0,1]$ is a user-specified blending term that controls the relative influence of the curvature and data terms. The level set field update equation is then expressed as:

$$\phi(x,t+\Delta t)=\phi(x,t)+\Delta t F(x,t)|\nabla \phi(x,t)|. \quad (1)$$

In contrast to the narrow band process, the sparse field process incrementally updates a linked list of active voxels during each iteration step without traversing the entire computational domain except during initialization. The work-complexity of the sparse field process is O(n) during initialization and O(m) after initialization, where n is the size of the input data set and m is the size of the active computational domain. In the sparse field process the total amount of work is reduced by a constant factor by tracking the active computational domain at the granularity of individual voxels instead of large tiles. Due to its reliance on linked lists the sparse field process is ill-suited for parallel processing and is performed in a sequential fashion having a step-complexity that is equal to its work-complexity.

In the sparse field level set segmentation method according to an embodiment of the invention calculations are substantially limited to a minimal set of active voxels in the level set field. The minimal set of active voxels at time t is defined as $A(t)=\{x|\phi(x,t)\neq(x,t-\Delta t)\}$. A(t) is the minimal set of active voxels that is updated at time t to ensure the correctness of the process because if $\phi(x,t)=\phi(x,t-\Delta t)$ then a new value is not written into the level set field at x and if $\phi(x,t)\neq\phi(x,t-\Delta t)$ then a new value is calculated and written into the level set field at x.

From equation (1) two conditions are derived, each of which is sufficient to imply that a voxel x is inactive and, therefore, excluded from the minimal set of active voxels: $x \in A(t)$. Both conditions are independent of the speed function employed. The first condition $\zeta_1(x,t)$ follows directly from equation (1) as follows:

$$\zeta_1(x,t)\equiv|\nabla\phi(x,t-\Delta t)|=0. \quad (2)$$

For deriving the second condition—according to an embodiment of the invention—it is assumed that $\eta(x)$ is the set of voxels in the immediate neighborhood of x and includes x itself. It is observed that if $\phi(x,t-\Delta t)=\phi(x,t-2\Delta t)$, then $$\frac{d\phi(x)}{dt} = 0$$

and the level set surface $\phi$ is in a state of temporal equilibrium at x. Assuming the speed function is defined locally, the only event capable of disrupting the state of temporal equilibrium at the voxel x is if the level set surface $\phi(n)$ changes for a neighbor voxel $n \in \eta(x)$. If the level set field is also in a state of temporal equilibrium for the voxels in $\eta(x)$ at time $t-2\Delta t$, then x continues to be in a state of temporal equilibrium at time $t-\Delta t$. This leads to the second condition $\zeta_2(x,t)$ as follows:

$$\zeta_2(x,t)\equiv\forall_{n\in\eta(x)}:\phi(n,t-\Delta t)=\phi(n,t-2\Delta t). \quad (3)$$

The minimal set of active voxels is then formally expressed as follows:

$$A(t) = \begin{cases} \text{Domain}(\phi), & t = 0 \\ \{x \mid \neg \zeta_1(x, 0)\}, & t = \Delta t \\ \{x \mid \neg \zeta_1(x, t) \wedge \neg \zeta_2(x, t)\}, & t > \Delta t \end{cases} \quad (4)$$

Referring to FIG. 1, a sparse field level set segmentation method for segmenting a volume dataset according to an embodiment of the invention is provided. In this figure the level set field is assumed to be 2D for simplicity. The image data ID is shown in grey, the currently segmented area CSA in the level set field is shown in light grey, and intermediate results IR for calculating the active set are shown in dark grey. Active voxels are outlined in black, and inactive voxels are shown as partially transparent grey. The user places a seed to initialize the level set field and the initial set of active voxels is calculated according to the spatial derivatives of the level set field (a). During each iteration all active voxels are updated (b) and the new set of active voxels is calculated according to the spatial and temporal derivatives of the level set field (c). If the new set of active voxels is empty (d) then the segmentation has converged (e). Otherwise the process goes back to (b).

A sequential pseudo code for initializing the level set field and the active set based on the initial spatial gradient of the level set field is described herein below. Input data are the user-specified center voxels $x_{seed}$ and radius $r_{seed}$ of a spherical seed, as well as a user-specified maximum distance $d_{max}$ and minimum distance $d_{min}$ used to clamp the calculated distances to the spherical seed. The initial level set field $\phi(x,0)$ and the initial active set $A(\Delta t)$ are then calculated as follows:

```
1    for each voxel x ∈ Domain(φ)
2        φ(x, 0) ← Clamp(Distance(x,x_seed) − r_seed,d_min,d_max)
3    end for
4    A(Δt) ← ∅
5    for each voxel x ∈ Domain(φ)
6        for each voxel n ∈ η(x)
7            if φ(n, 0) ≠ φ(x, 0)
8                A(Δt) ← A(Δt) ∪ {x}
9            end if
10       end for
11   end for
```

A sequential pseudo code for updating the level set field and the set of active voxels until the segmentation has converged is described herein below. Input data are the initial level set field $\phi(x,0)$ and the initial set of active voxels $A(\Delta t)$. The spatial and temporal derivatives of the level set field are examined by steps 11 and 9, respectively. It is noted that the process is performed without traversing the entire computational domain. Since the process tracks the minimal set of changing voxels, the number of active voxels approaches 0 as the segmentation converges. The number of active voxels drops to 0 once the level set surface has converged. The updated level set field $\phi(x,0)$ and the updated active set $A(\Delta t)$ are then calculated as follows:

```
1    t ← Δt
2    while A(t) ≠ ∅
3        for each vowel x ∈ A(t)
4            φ(x, t) = φ(x, t − Δt) + dφ(x)/dt
5        end for
6        A(t + Δt) ← ∅
7        for each voxel x ∈ A(t)
8            for each voxel n ∈ η(x)
9                if φ(n, t) ≠ φ(x, t − Δt)
10                   for each voxel y ∈ η(n) ∩ η(x)
11                       if φ(y, t) ≠ φ(x, t)
12                           A(t + Δt) ← A(t + Δt) ∪ {x, y}
13                       end if
14                   end for
15               end if
16           end for
17       end for
18       t ← t + Δt
19   end while
```

During each iteration step the level set field update is performed on all active voxels according to equation 1—illustrated as (b) in FIG. 1. After updating the level set field φ, the set of active voxels itself is updated. Voxels that are no longer active are removed from the active set and voxels that have become active are added to the active set. Since either condition $\zeta_1$ or $\zeta_2$ is sufficient to exclude voxels from the set of active voxels, both $\zeta_1$ and $\zeta_2$ must be false for the corresponding voxels to be included in the set of active voxels—illustrated as (c) in FIG. 1. If the updated set of active voxels is empty—illustrated as (d) in FIG. 1—then the segmentation has converged—illustrated as (e) in FIG. 1.

A double buffering approach is used to update the level set field. During each iteration step the level set field from the previous iteration step $\phi_{read}=\phi(t-\Delta t)$ is read and the new values are written into the level set field $\phi_{write}=\phi(t)$. After having completed this update step, the references to $\phi_{read}$ and $\phi_{write}$ are swapped. It is important to note that for a given iteration step t, it is actually the case that $\phi_{write}=\phi(t-2\Delta t)$ and $\phi_{read}=\phi(t-\Delta t)$ prior to writing new level set values into $\phi_{write}$. Since not every voxel is updated at every iteration step, it must be ensured that the values from $t-2\Delta t$ are allowed to remain in $\phi_{write}$ only if they have not changed from iteration step $t-2\Delta t$ to iteration step $t-\Delta t$. Otherwise must be ensured that these values are updated. Fortunately, if $\phi(x,t-2\Delta t)\neq\phi(x,t-\Delta t)$, then equation (4) ensures $x \in A(t)$ and a new level set value that depends only on $\phi_{read}=\phi(t-\Delta t)$ is written into $\phi_{write}$ at x.

Figure 2:
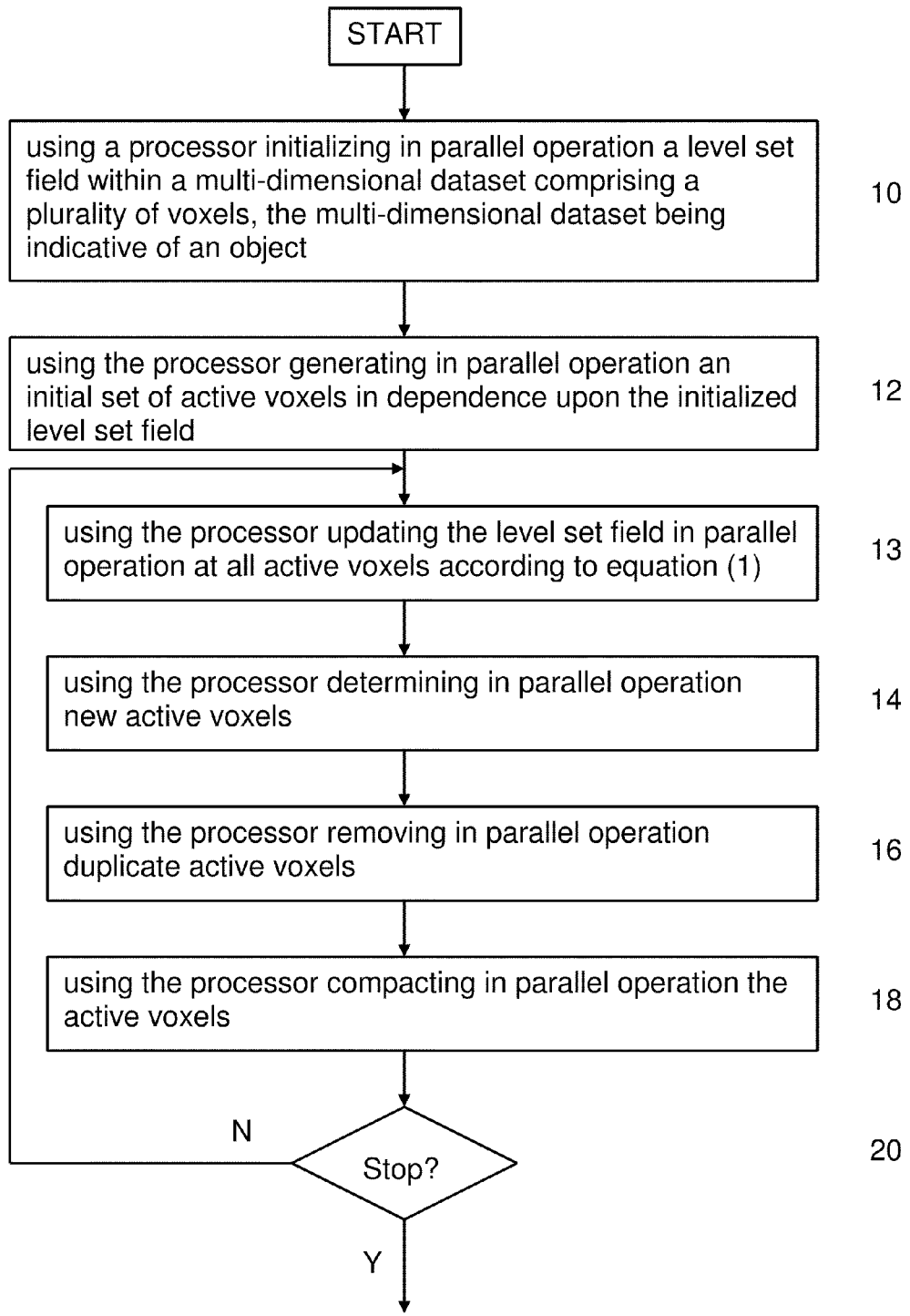
FIG. 2 is a simplified flow diagram illustrating a parallel sparse field level set segmentation method according to an embodiment of the invention.
Figure 2:
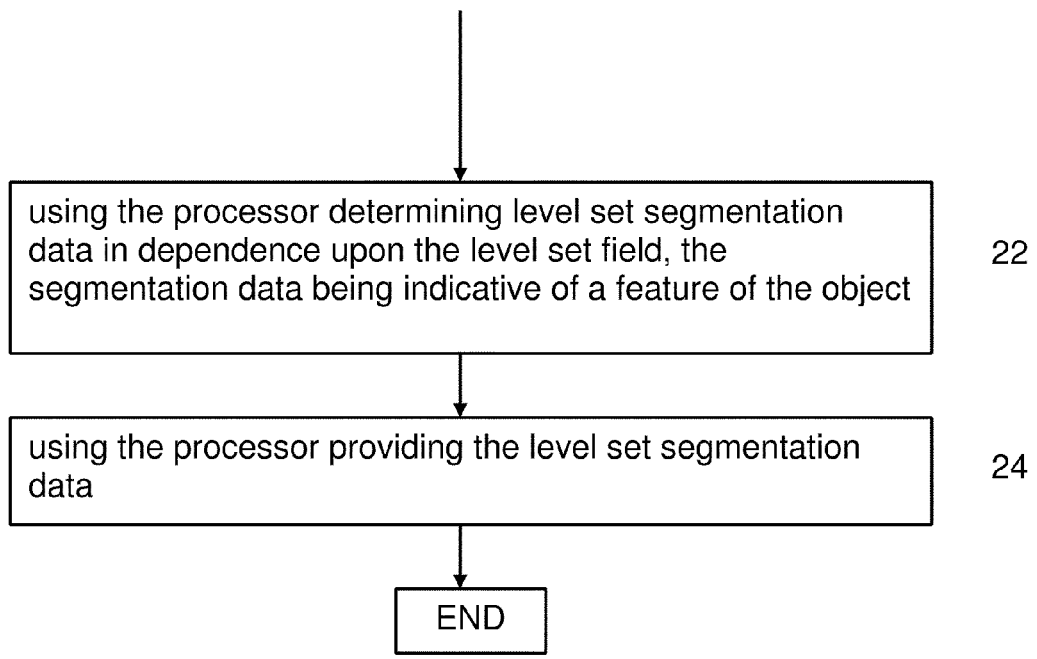

Referring to FIG. 2, a parallelized sparse field level set segmentation method for segmenting a volume dataset according to an embodiment of the invention is provided. The parallelized sparse field level set segmentation method is work-efficient and step-efficient, i.e. the parallelized sparse field level set segmentation method has a work-complexity and step-complexity of at most O(n) during initialization and O(m) after initialization. At 10, a level set field within a multi-dimensional dataset comprising a plurality of voxels is initialized in parallel operation using a processor. The multi-dimensional dataset is indicative of an object. An initial set of active voxels is then generated—12—in parallel operation in dependence upon the initialized level set field. At 13, the level set field is updated at all active voxels according to equation (1). At 14, new active voxels are determined in parallel operation. Duplicate active voxels are then removed—16—in parallel operation, followed by compacting the non-duplicate active voxels—18—in parallel operation. The steps 14 to 18 are then repeated—20—until a quantitative stopping criterion is met. At 22, level set segmentation data indicative of a feature of the object are determined in dependence upon the level set field. Finally, the level set segmentation data are provided—24—for example, for display on a Graphical User Interface (GUI) in a human comprehensible fashion.

Except where noted, each step below describes a single parallel pass that requires global synchronization when finished and does not require additional synchronization. In step (1) and (5) below, a parallel operation known as buffer compacting is employed as disclosed, for example, in Sengupta S, et al. "*Efficient parallel scan algorithms for GPUs*", NVR, 2008. The process used for buffer compacting has O(w) work-complexity and $O(\log_2 w)$ step-complexity where w is the size of the input data set.

It is assumed that each voxel $x \in$ Domain (φ) has a unique index i and $x_i$ refers to the voxel $x \in$ Domain (φ) with the index i. It is also assumed that during pass of the process, each thread has a unique ID h. It is assumed that $\phi_{read}$, $\phi_{write}$, and U are references to three distinct 3D buffers such that Domain (φ)=Domain ($\phi_{read}$)=Domain ($\phi_{write}$)=Domain (U) and that $\forall_x \in$ Domain(φ):$\phi_{read}(x)=\phi_{write}(x)=U(x)=$null. It is assumed that the voxels in φ are 6-connected and therefore it is ensured that for each voxel $x \in$ Domain (φ), η(x) contains at most seven elements, i.e. the 6-connected neighbors of x in 3D and x itself. Finally it is assumed that the set E={(0,0,0), (0,0,±1), (0, ±1, 0), (±1, 0,0)}.

Step (1) Initialization

Each voxel in $\phi_{read}$ and $\phi_{write}$ is initialized in parallel according to a user-specified seed region as described herein above, where thread h is responsible for initializing both $\phi_{read}$ and $\phi_{write}$ at the 3D array index $x_h$.

Figure 3:
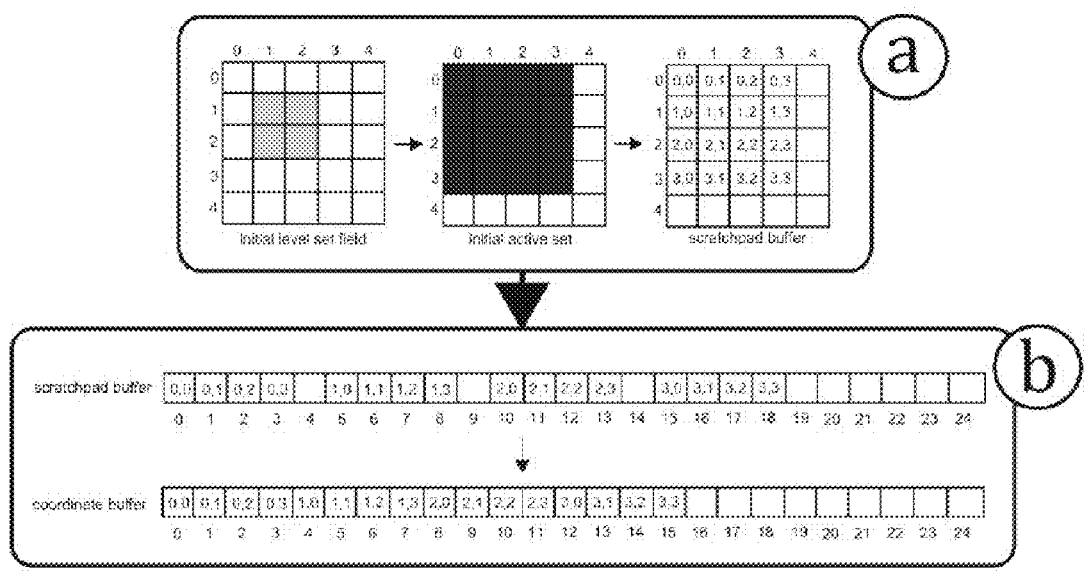
FIG. 3 is a simplified flow diagram illustrating an initializing process in the parallel sparse field level set segmentation method according to an embodiment of the invention.

A densely packed buffer of active voxels V is generated based on the contents of (φ), as illustrated in FIG. 3 assuming the level set field being 2D for simplicity. It is assumed that each voxel $v \in V$ has a unique index i and $v_i$ refers to the voxel $v \in V$ with the index i. The process begins by iterating in parallel over every voxel in $\phi_{read}$ to test for active voxels, where thread h is responsible for testing $x_h$. If $x_h$ is deemed active according to equation (4), thread h writes $x_h$ to a 3D scratchpad buffer U using $x_h$ as the 3D array index—(a) in FIG. 3. Since it is likely that not all of the tested voxels were deemed active, U will likely contain a scattered collection of null values and active voxels. The scratchpad buffer U is then interpreted as one-dimensional and compacted in parallel to produce the densely packed buffer of active voxels V—(b) in FIG. 3. It is noted that since U contains either a unique value or null at all voxels, it is ensured that there are no duplicate voxels in V.

At this point the parallelized sparse field level set segmentation method is initialized and for the remainder of the process it is avoided to iterate over the entire computational domain.

Step (2) Updating the Level Set Field

During each iteration step the scratchpad buffer U is cleared and $\phi_{write}$ updated. Both tasks are accomplished by iterating in parallel over V. Thread h is responsible for updating $\phi_{write}$ at the 3D array index $v_h$ according to equation (1) and for setting U to null at the 3D array index $v_h$. This ensures to completely clear U because the only non-null values in U are at active voxels, each of which was previously compacted into V. At this point updating φ is finished and references to $\phi_{read}$ and $\phi_{write}$ are swapped.

After having updated φ for the current iteration step a new densely packed buffer of active voxels $V_{new}$ is generated for the following iteration step. The pipeline for generating $V_{new}$ is described in steps (3), (4), and (5) herein below.

Step (3) Generating New Active Voxels

Figure 4:
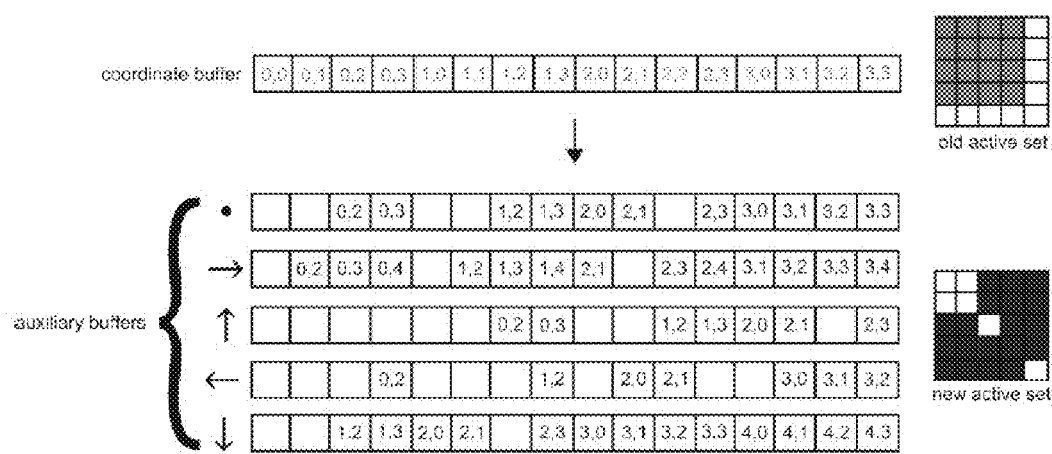
FIG. 4 is a simplified flow diagram illustrating determination of new active voxels in the parallel sparse field level set segmentation method according to an embodiment of the invention.

The process iterates in parallel over V to test for new active voxels according to equation (4), where thread h is responsible for testing all voxels $n_h \in \eta(V_h)$. Suppose e is the offset vector from $v_h$ to $n_h$ defined as $e=n_h-v_h$. If $n_h$ is deemed active according to equation (4), then thread h writes $n_h$ to an auxiliary buffer $B_e$ using h as the 1D array index. Since $n_h$, $v_h \in \eta(V_h)$, there are seven possible values for $e \in E$ and a total of seven auxiliary buffers are used. This process is illustrated in FIG. 4, assuming the level set field being 2D and 4-connected for simplicity. Each thread tests all the voxels in the immediate neighborhood of exactly one old active voxel. If a voxel is deemed active, then the thread that deemed it active writes it to an auxiliary buffer. The choice of auxiliary buffer is determined by the offset from the old active voxel to the neighboring new active voxel. In FIG. 4 the auxiliary buffers are labeled •, →, ↑, ←, and ↓, respectively to denote the different possible offsets from old active voxels to neighboring new active voxels. When this step is finished, all new active voxels are stored in one or more auxiliary buffers. Although it is ensured that there are no duplicate voxels in each auxiliary buffer take individually, there may be duplicate voxels in the auxiliary buffers taken collectively. These duplicate voxels are subsequently removed, as will be described herein below with reference to FIG. 5.

It is assumed that for all e ∈ E, each voxel $b^e \in B_e$ has a unique index i and $b_i^e$ refers to the voxel $b^e \in B_e$ with the index i. It is noted that during the step of analyzing the temporal derivative $$\frac{d\phi}{dt}$$

as required in equation (4) of the process $\phi_{read}=\phi(t-\Delta t)$ and $\phi_{write}=\phi(t-2\Delta t)$.

Since it is likely that not all tested voxels were deemed active, it is likely that the seven auxiliary buffers contain scattered collections of null values and active voxels. Since each new active voxel is the 6-connected neighbor of some old active voxel, and all 6-connected neighbors of old active voxels are tested by at least one thread, it is ensured that all new active voxels are contained in at least one of the seven auxiliary buffers.

The seven auxiliary buffers may contain duplicate voxels when taken collectively, because some voxels may be tested repeatedly by different threads. Some thread p may deem a voxel r to be active. For the thread p suppose that $r-v_p=(0, 0, 1)$ and therefore thread p writes r to the auxiliary buffer $B_{0,0,1}$. Some different thread q may also deem r to be active. For the thread q suppose that $r-v_q=(1, 0, 0)$ and therefore thread q writes r to the auxiliary buffer $B_{1,0,0}$. In this case voxel r appears in both $B_{0,0,1}$ and $B_{1,0,0}$.

Step (4) Removing Duplicate Active Voxels

Although there may be duplicate voxels in the seven auxiliary buffers taken collectively, there are no duplicate voxels in each of the seven auxiliary buffers taken individually, because there are no duplicate voxels in V and for all e ∈ E, the auxiliary buffer $B_e$ contains either the value $b_i^e=v_i+e$ or $b_i^e$=null for all 1D array indices i.

Figure 5:
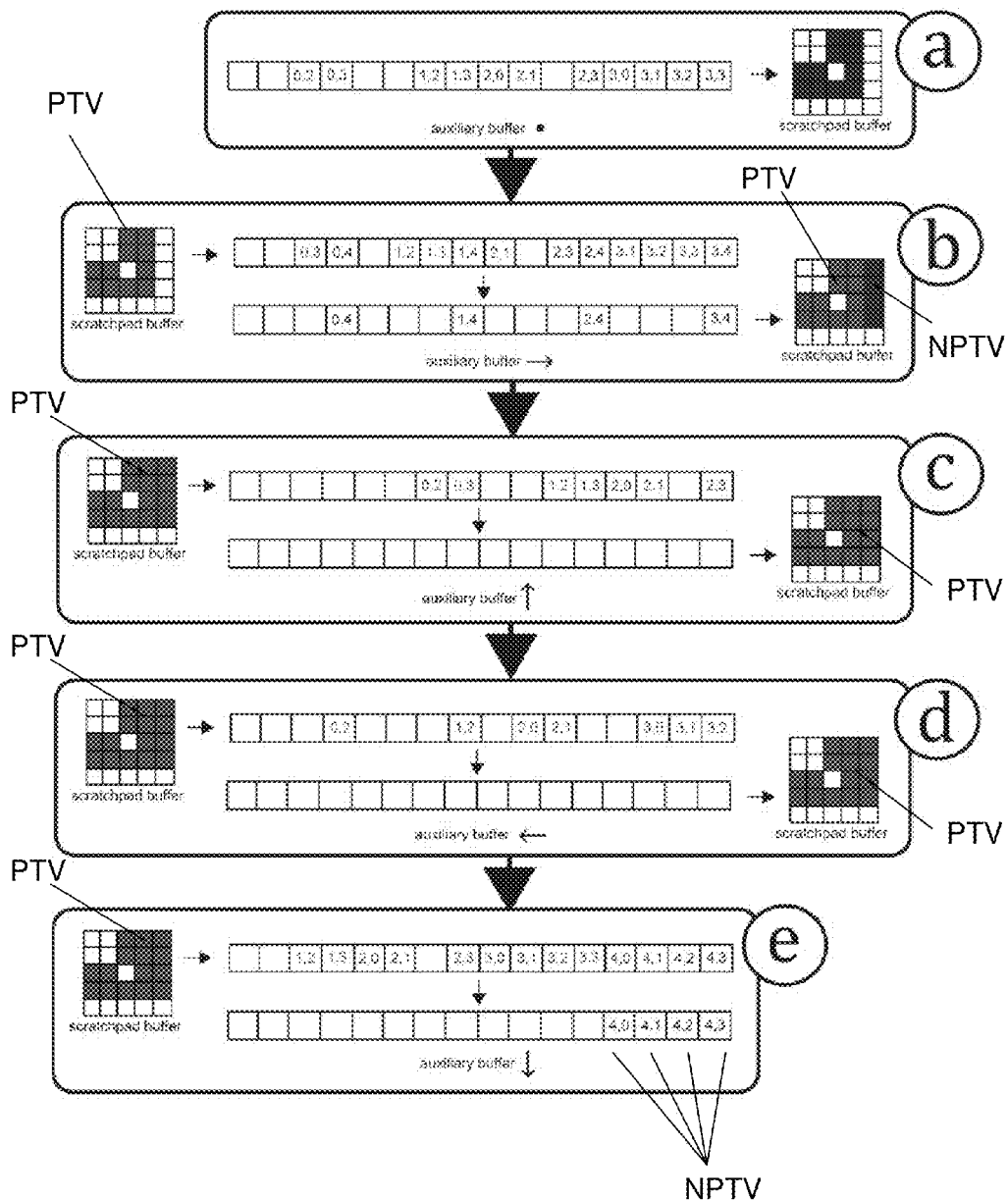
FIG. 5 is a simplified flow diagram illustrating removal of duplicate active voxels in the parallel sparse field level set segmentation method according to an embodiment of the invention.

Therefore, it is possible to efficiently remove all duplicate voxels in seven passes without sorting or additional per-thread synchronization. It is noted that global synchronization is performed at the end of each pass. This process is illustrated in FIG. 5, assuming the level set field being 2D and 4-connected for simplicity. In the first of the passes, the process iterates in parallel over $B_{0,0,0}$ and conditionally tags a scratchpad buffer U using the voxels in the auxiliary buffer • as array indices. Thread h is responsible for tagging U at the 3D array index $b_h^{0,0,0}$ if and only if $b_h^{0,0,0}\neq$null—(a) in FIG. 5. In the subsequent five passes—(b) to (d) in FIG. 5—the offset vector e is set to be different in the set E—{(0,0,0)} and a different auxiliary buffer $B_e$ is chosen over which to iterate on the current value of e. In each pass the process iterates in parallel over the chosen auxiliary buffer $B_e$ and conditionally tests and sets U. Thread h is responsible for tagging U at the 3D array index $b_h^e$ if and only if $b_h^e\neq$null. If $b_h^e\neq$null and U is already tagged at the 3D array index $b_h^e$, thread h discards $b_h^e$ by writing a null value in $B_e$ using h as the 1D array index. If $b_h^e\neq$null and U is not already tagged at the 3D array index $b_h^e$, thread h tags U at $b_h^e$. In other words, in the subsequent passes (b) to (d) previously tagged voxels PTV are removed from the auxiliary buffers →, ↑, and ← and not previously tagged voxels NPTV are tagged.

In the last pass—(e) in FIG. 5—the offset vector e is set to be the only remaining value in the set E and the process is performed exactly as in the previous five passes with the exception that it is not necessary to tag U since there are no subsequent passes that will read from it. In other words, in the final pass (e) any previously tagged voxels are removed from the auxiliary buffer ↓ but it is not necessary to tag the scratchpad buffer U since there are no subsequent passes that will read from it. The scratchpad buffer remained constant in (c) and (d) because all voxels in the auxiliary buffers ↑ and ← had already been tagged in previous passes. Each pass is free of race conditions examines one auxiliary buffer and there are no duplicate voxels within each auxiliary buffer. At the end of the seven passes all the active voxels that were originally contained in one or more of the seven auxiliary buffers are now contained in exactly one auxiliary buffer.

Step (5) Compacting New Active Voxels

Figure 6:
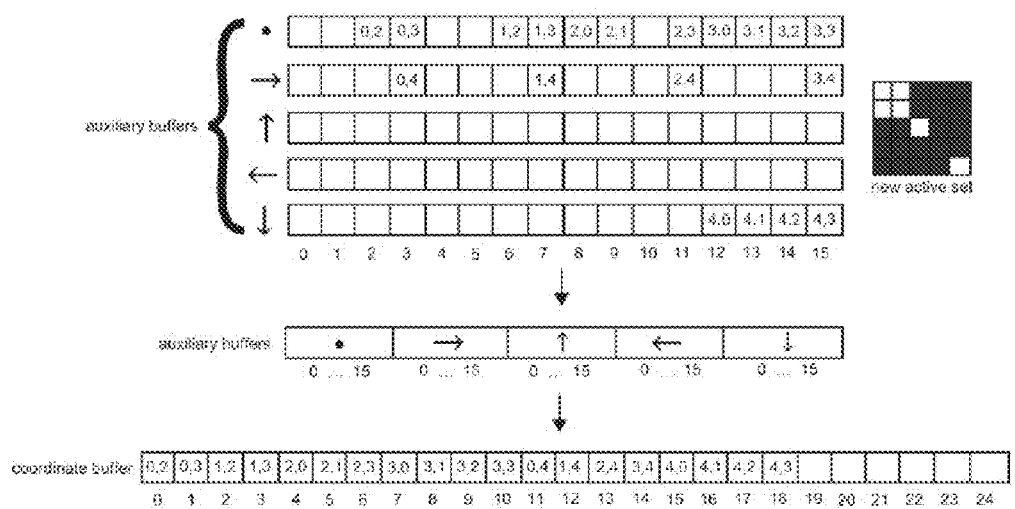
FIG. 6 is a simplified flow diagram illustrating compacting of new active voxels in the parallel sparse field level set segmentation method according to an embodiment of the invention.

The seven auxiliary buffers are compacted in parallel to produce a new densely packed buffer of active voxels $V_{new}$, as is illustrated in FIG. 6 assuming the level set field being 2D and 4-connected for simplicity. The seven auxiliary buffers are allocated contiguously in memory to reduce the number of passes required for the compacting step, i.e. all auxiliary buffers are interpreted as a single one-dimensional buffer which is compacted in parallel to produce a new voxel buffer for the next iteration step.

Step (6) Quantitative Criterion for Segmentation Convergence

If $V_{new}$ contains active voxels, the auxiliary buffers are cleared, V is cleared, references to V and $V_{new}$ are swapped and the process continues with step (3). Otherwise the process has converged on the segmented surface contained in $\phi_{read}$.

During initialization the parallelized sparse field level set segmentation method has O(n) work-complexity and O($\log_2$ n) step-complexity. After initialization the process has O(m) work-complexity and O($\log_2$ m) step-complexity and is, therefore, both work-efficient and step-efficient as is described herein below.

We define n as the size of the entire computational domain and m as the size of the active computational domain. It is noted that for all offset vectors e ∈ E, the size of the auxiliary buffer is equal to m.

I. Initializing the level set field and testing for active voxels in step (1) uses two passes over the entire computational domain with a single global synchronization point between these two passes. Therefore, initializing the level set field and testing for active voxels has O(n) work-complexity and O(1) step-complexity.

II. Compacting the active voxels in step (1) uses a buffer compacting operation over the entire computational domain and therefore has O(n) work-complexity and O($\log_2$ n) step-complexity.

III. Steps (2) and (3) iterate over the active computational domain and are performed with a global synchronization point at the end of each step. Therefore, steps (2) and (3) have O(m) work-complexity and O(1) step-complexity.

IV. Step (4) uses one pass over each of the seven auxiliary buffers with a global synchronization point after each pass. Therefore, step (4) has O(m) work-complexity and O(1) step-complexity.

V. Step (5) uses a buffer compacting operation over the seven auxiliary buffers. Therefore, step (5) has O(m) work-complexity and O($\log_2$ m) step-complexity.

VI. Step (6) potentially clears the buffer C and each of the seven auxiliary buffers, where these buffers are all of size equal to the size of the active computational domain m. Step (6) potentially uses a single global synchronization point when it is finished, and therefore has O(m) work-complexity and O(1) step-complexity.

VII. From (I) and (II) the parallelized sparse field level set segmentation method has O(n) work-complexity and O($\log_2$ n) step-complexity during initialization.

VIII. From (III), (IV), (V), and (VI) the parallelized sparse field level set segmentation method has O(m) work-complexity and O($\log_2$ m) step-complexity after initialization.

IX. It is known that the sparse field process has O(n) work-complexity during initialization and O(m) work-complexity after initialization.

X. It is known that the sparse field process has step-complexity equal to its work complexity.

XI. From (VII), (VIII), (IX), and (X) follows that the parallelized sparse field level set segmentation method is both work-efficient and step-efficient.

Figure 7:
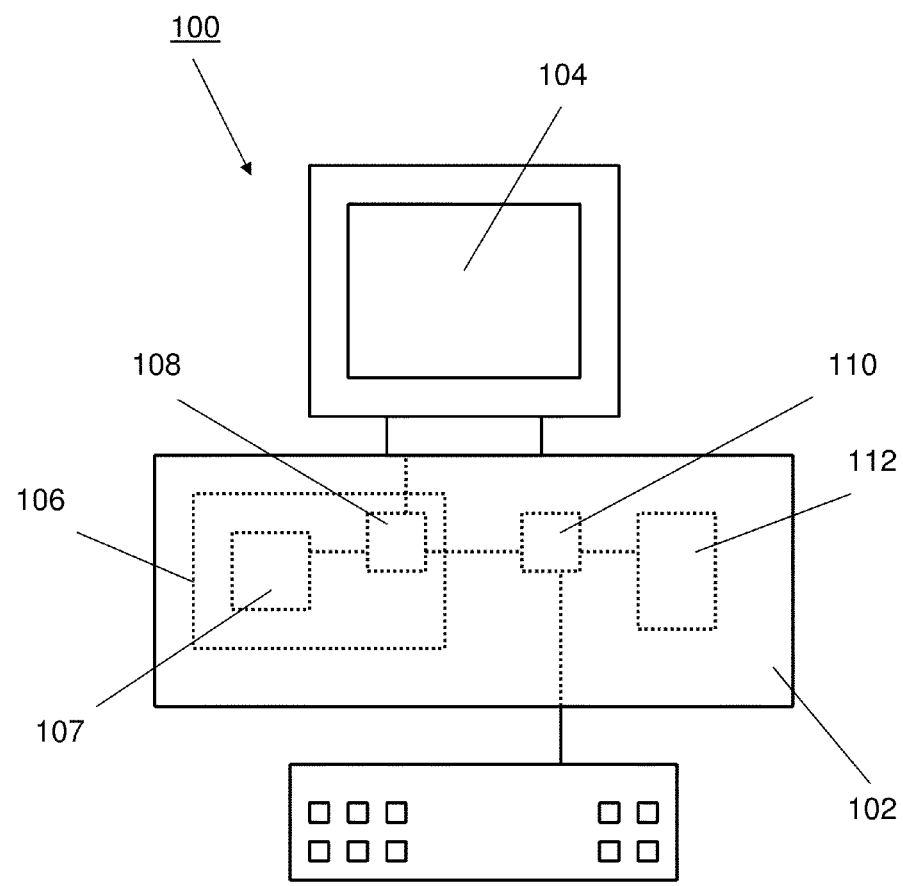
FIG. 7 is a simplified block diagram illustrating a GPU implementation of the parallel sparse field level set segmentation method according to an embodiment of the invention.

Referring to FIG. 7, an example 100 of a system for implementing the parallelized sparse field level set segmentation method for segmenting a volume dataset according to an embodiment of the invention is shown. The system comprises, for example, a workstation 102 for processing volume datasets using a GPU 106. For example, a medical practitioner is processing a volume dataset for performing a diagnosis. During the processing the medical practitioner interacts with the GPU for segmenting the volume dataset, for example, determining a seed surface, which is displayed on monitor 104. It will become evident to those skilled in the art that the embodiments of the invention are implementable by executing executable commands stored in memory 107 such as, for example, non-volatile or non-transitory memory in the form of a hard-drive or flash memory, and executed on at a processor 108 of one of various standard GPUs wherein the executable commands are created using one of various standard programming languages and GPUs. Alternatively, the embodiments of the invention are implemented using other processing units such as, for example, a CPU 110 and system memory 112 of various types of computers.

It is noted that memory accesses to the 1D buffers are achieved at substantially maximum efficiency on modern GPU architectures, since these memory accesses can be fully coalesced by the hardware-managed memory controller into a small number of memory transactions. This is because the 1D buffers are always accessed via a unique thread index such that neighboring threads always access neighboring locations in memory. In general, the memory accesses to the 3D buffers can not be coalesced. After initialization these buffers are accessed at sparse active coordinates which are not guaranteed to be neighboring locations in memory for neighboring threads. However, since there is some spatial locality in the active computational domain it is probable that nearby active coordinates in V are nearby in 3D space. This spatial locality is leveraged by reading from the 3D buffers via the hardware-managed GPU texture cache. To improve multi-dimensional texture cache coherence a swizzled memory layout, as described, for example, in Engel K, Hadwiger M, Kniss J, Rezk-Salama C, and Weiskopf D "Real-Time Volume Graphics", A K Peters, 2006, is employed.

The data type of $\phi_{read}$ and $\phi_{write}$ is 32-bit floating point while the data type of all other buffers is 32-bit integer. To increase memory efficiency when storing level set field coordinates in the integer buffers, the x, y, and z components of each 3D coordinate is represented by 11, 11, and 10 bits, respectively. If the level set field contains more than 2048×2048×1024=$2^{32}$ elements, the data type of each integer buffer is expanded such that the largest possible level set field coordinate can fit into a single element.

In an example, the parallelized sparse field level set segmentation method for segmenting a volume dataset according to an embodiment of the invention has been implemented using the CUDA programming language for execution on an Intel 2.5 GHz Xeon Processor with 4 GB of memory and an NVIDIA GTX 280 GPU with 1.0 GB of memory, 240 1.2 GHz cores, and a peak theoretical memory bandwidth of 141 gigabytes per second. The CUDA programming language enables a programmer to write computational kernels in a language similar to C. The computational kernels are launched by a host application and are executed in parallel on the GPU. Since the GPU is capable of executing a plurality of instances of a computational kernel simultaneously and each kernel has random read and write access to the GPU memory, the CUDA programming language is well suited for implementing data-parallel processes.

The GPU narrow band process for comparison has been implemented using the OpenGL graphics library and the GLSL programmable shading language.

The parallelized sparse field level set segmentation method has been evaluated by performing various segmentation tasks on volumetric image data sets generated from the BrainWeb Simulated Brain Database. The BrainWeb Simulated Brain Database is used to generate simulated MRIs with a variety of signal-to-noise ratio (SNR) and intensity non-uniformity (INU) values in a controlled setting where the ground truth classification of each voxel is known. INU measures the effect of non-linearly distributed intensity distortions in the image. These segmentation tasks have been repeated using the parallelized sparse field level set segmentation method for segmenting a volume dataset according to an embodiment of the invention and the GPU narrow band process by performing a series of repeated (N=10) white matter segmentations on $256^3$ T1-weighted (T1w) MRIs with varying SNR and INU values. For the segmentation a randomly selected seed location has been used. The accuracy of each segmentation was measured by calculating the Jaccard Score, the Dice Coefficient, and the Total Correct Fraction.

To evaluate the speed and computational complexity of the parallelized sparse field level set segmentation method the white and grey matter a $256^3$ T1w MRI with SNR=11 and INU=40% has been segmented. The computation time per iteration and the total computation time for the segmentation was measured. Further, the number of active voxels per iteration and the total number of active voxels were measured.

Figure 8:
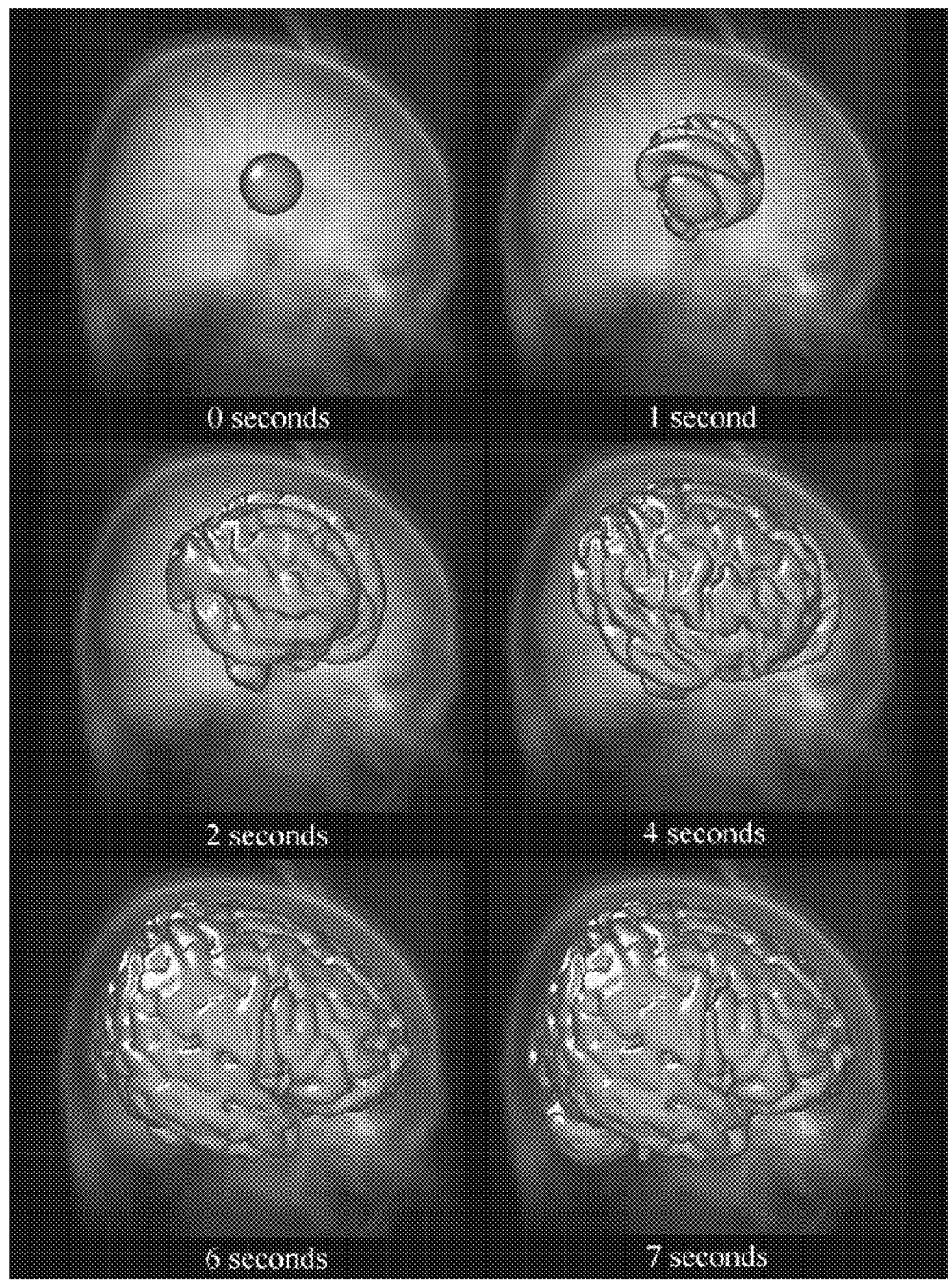
FIG. 8 shows diagrams illustrating a 3D segmentation process using the parallel sparse field level set segmentation method according to an embodiment of the invention.

FIG. 8 illustrates an interactive 3D visualization of the progression of the parallelized sparse field level set segmentation method while segmenting human white and grey matter in a $256^3$ T1w MRI with SNR=11 and INU=40%. The currently segmented region is shown as an iso-surface superimposed over a grayscale projection of the image volume. The parallelized sparse field level set segmentation method labels over 99.5% of white and grey matter correctly and converges on the final segmentation (bottom-right) in less than 8 seconds, i.e. 14 times faster than state-of-the-art parallel level set segmentation processes and 685 times faster than state-of-the-art sequential processes with no reduction in segmentation accuracy.

Figure 9:
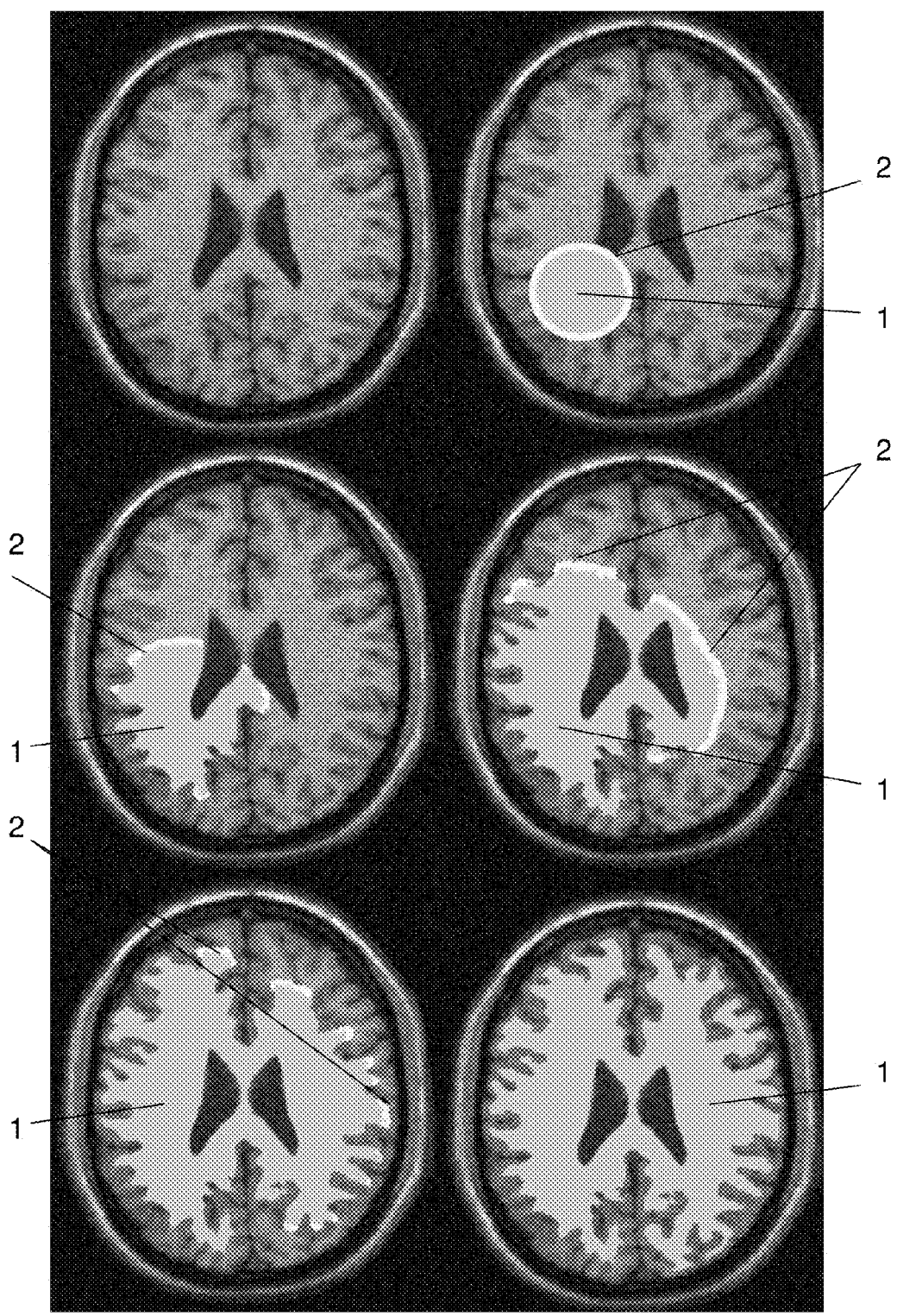
FIG. 9 shows diagrams illustrating 2D slices of a segmentation process using the parallel sparse field level set segmentation method according to embodiments of the invention.

FIG. 9 illustrates an interactive 2D visualization of the progression of the parallelized sparse field level set segmentation method while segmenting human white matter in a $256^3$ T1w MRI with SNR=11 and INU=40%. The currently segmented region is marked 1, while currently active voxels are marked 2. Regions that have converged are immediately marked as inactive due to the analysis of the spatial and temporal derivatives of the level set field. Less than 2% of the voxels are active at any time during the segmentation. This reduces the active computational domain by 16 times compared to state-of-the-art parallel level set segmentation processes with no reduction in segmentation accuracy. The number of active voxels drops to 0 when the segmentation process has completely converged (bottom-right).

Figure 10A:
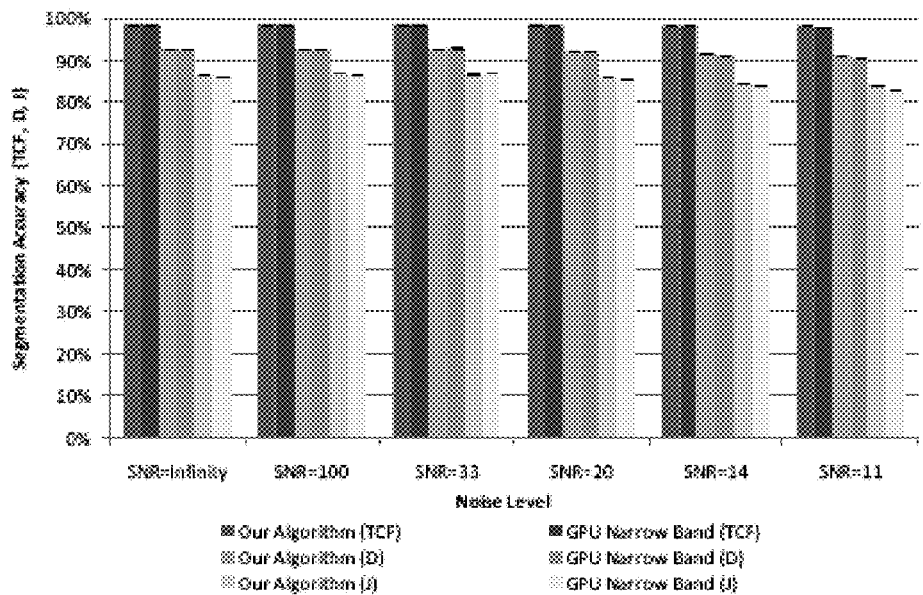
FIGS. 10a and 10b are diagrams illustrating a comparison of the accuracy of the parallel sparse field level set segmentation method according to embodiments of the invention with a state-of-the-art GPU narrow band process.
Figure 10B:
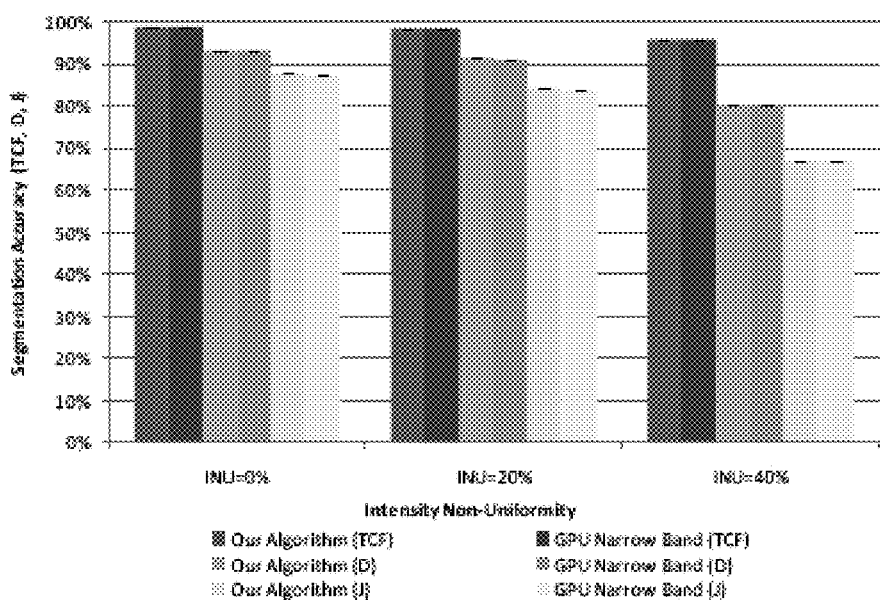

FIGS. 10a and 10b illustrate a comparison of the accuracy of the parallelized sparse field level set segmentation method with the GPU narrow band process. A set of repeated (N=10) white matter segmentations in a $256^3$ T1w MRI has been performed. Error bars are shown in black and indicate the standard error of the mean. For each segmentation a randomly selected seed point was used and the Jaccard Score (J), the Dice Coefficient (D), and the Total Correct Fraction (TCF) measured. In FIG. 10a the INU is set to 20% and the SNR varied from SNR=∞ to SNR=11. In FIG. 10b the SNR is set to 11 and the INU is varied from INU=0% to INU=40%. The parallelized sparse field level set segmentation method was accurate to within 0.3% of the GPU narrow band process and the standard error of the mean was less than 0.2%.

Figure 11A:
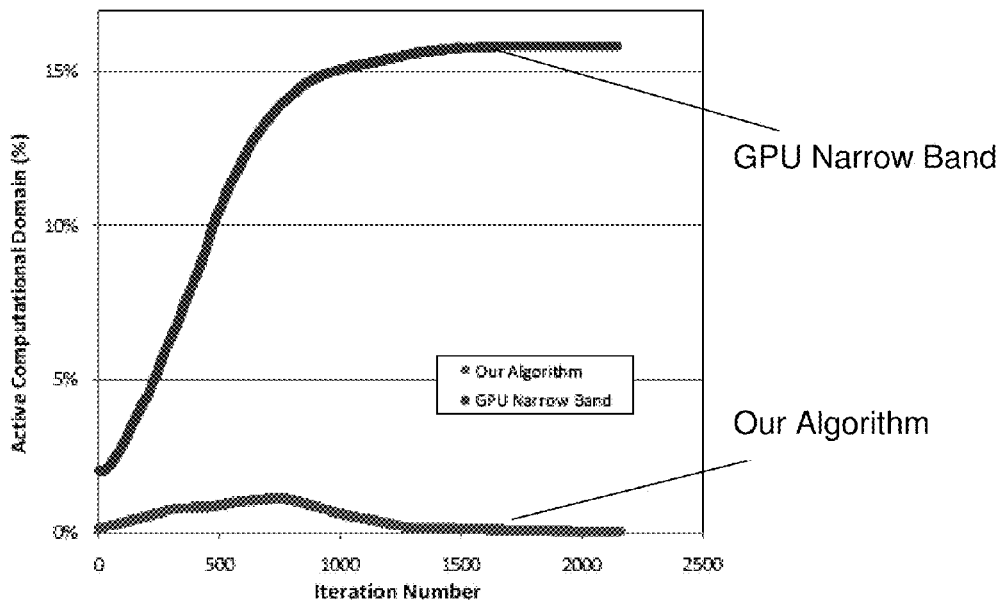
FIGS. 11a to 11c are diagrams illustrating a comparison of the performance of the parallel sparse field level set segmentation method according to embodiments of the invention with a state-of-the-art GPU narrow band process; and, FIGS. 12a and 12b are diagrams illustrating the per component performance of the parallel sparse field level set segmentation method according to embodiments of the invention.
Figure 11B:
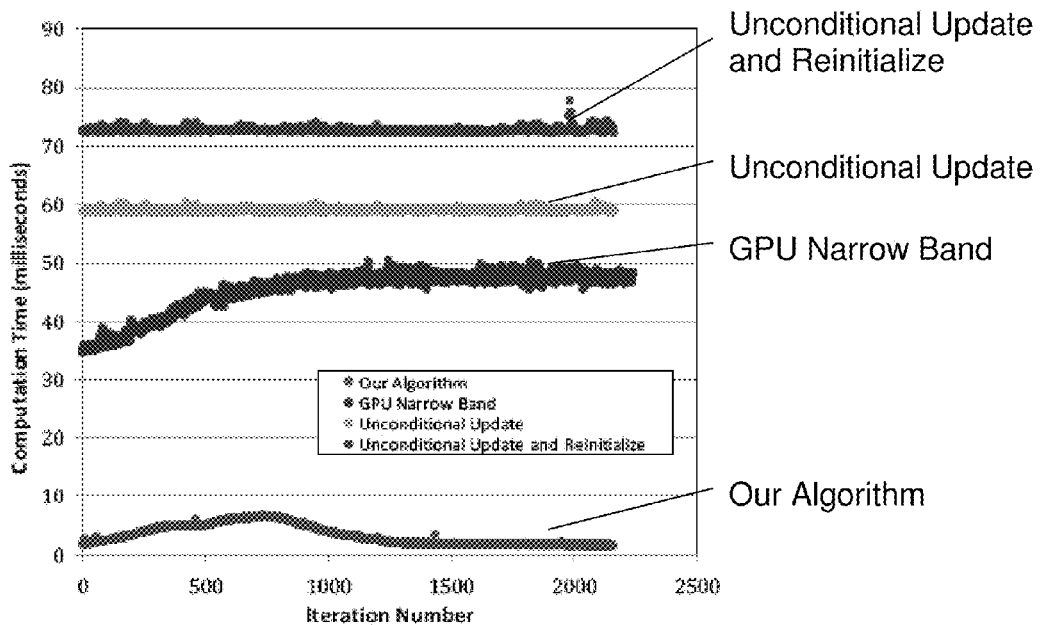
Figure 11C:
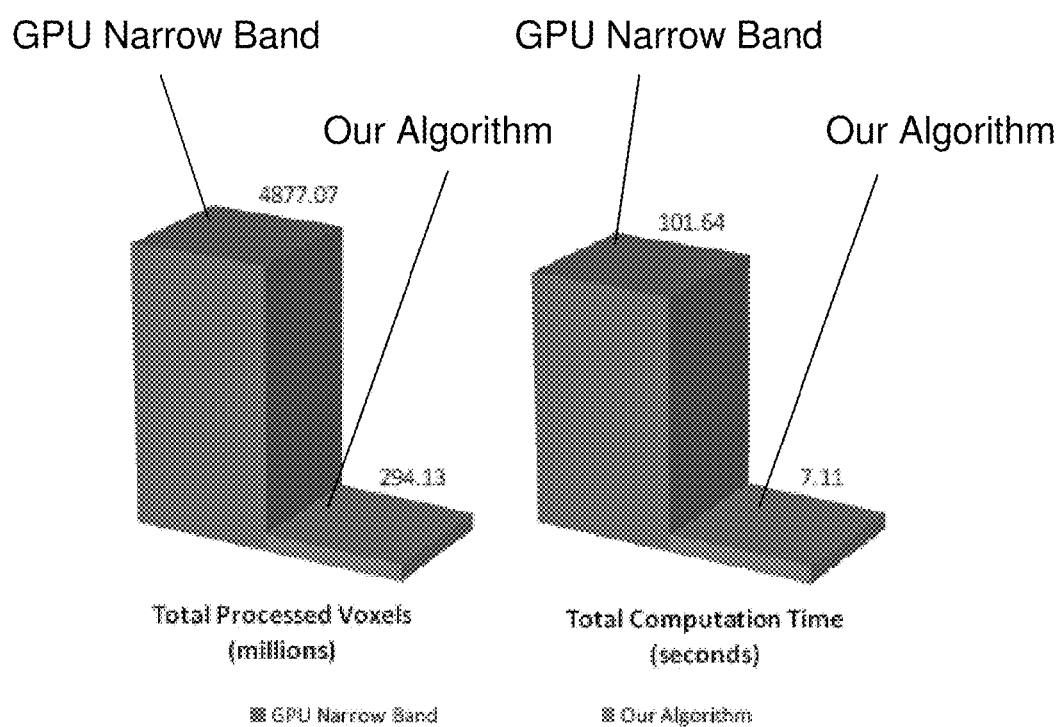

The performance of the parallelized sparse field level set segmentation method and the GPU narrow band process while segmenting the white and grey matter in a $256^3$ T1w MRI with an SNR=11 and an INU=40% is illustrated in FIGS. 11a to 11c. The FIGS. 11a to 11c illustrate the active computational domain per iteration step (a), the computation time per iteration (b), and the cumulative performance (d). FIG. 11a shows that in the parallelized sparse field level set segmentation method the number of active voxels quickly peaked and decreased over time while in the GPU narrow band process the number of active voxels monotonically increased over time. FIG. 11b shows that in the parallelized sparse field level set segmentation method after the number of active voxels had peaked, the speed increased over time in contrast to the GPU narrow band process.

Figure 12A:
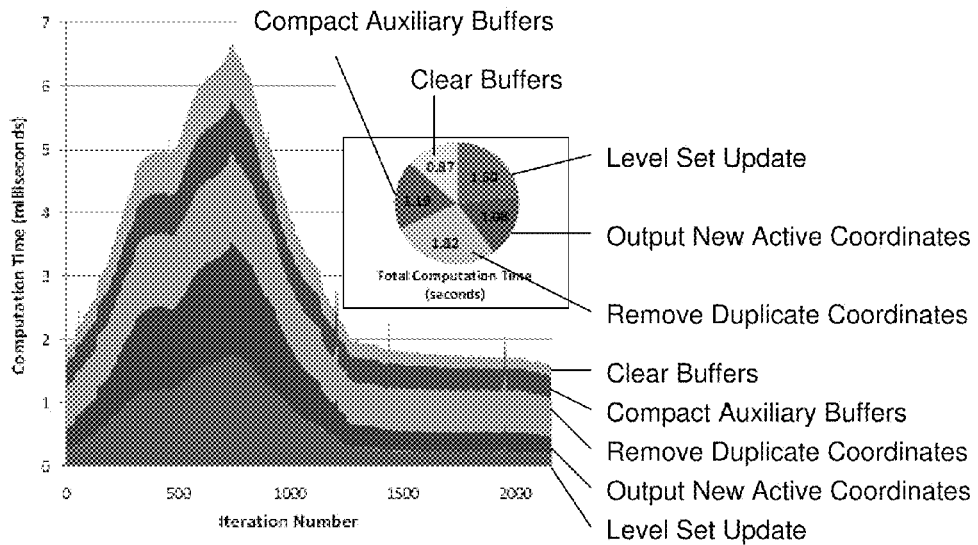
Figure 12B:
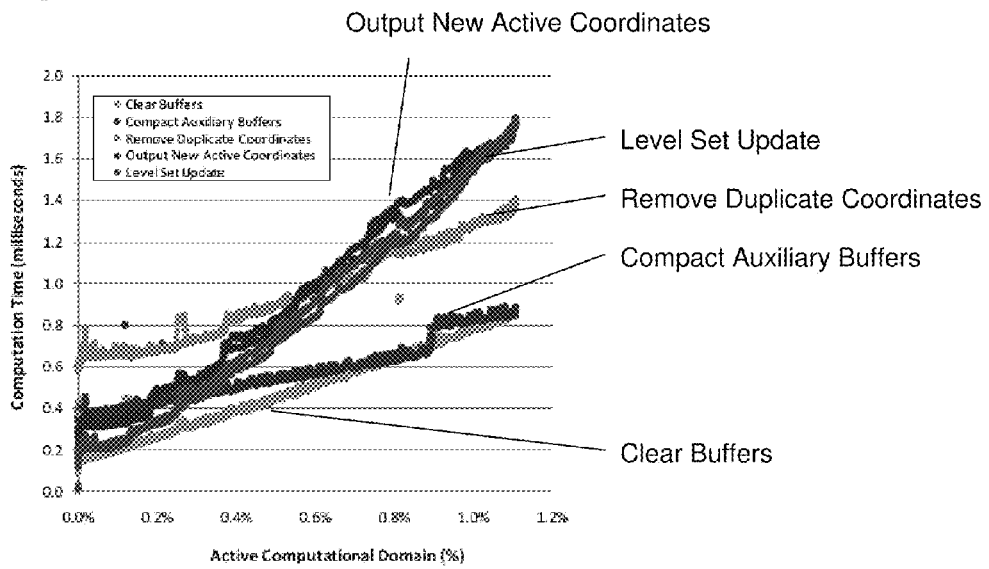

FIGS. 12a and 12b illustrate the per component performance of the parallelized sparse field level set segmentation method while segmenting the white and grey matter in a $256^3$ T1w MRI with an SNR=11 and an INU=40%, with FIG. 12a illustrating the computation time per iteration per component and FIG. 12b illustrating the computation time as a function of active computational domain size per component.

It will be apparent to persons skilled in the art that a number of variations and modifications can be made without departing from the scope of the invention as described herein.

What is claimed is:

1. A method comprising:
   a) using a processor initializing in parallel operation a level set field within a multi-dimensional dataset comprising a plurality of voxels, the multi-dimensional dataset being indicative of an object;
   b) using the processor generating in parallel operation an initial set of active voxels in dependence upon the initialized level set field;
   c) using the processor determining in parallel operation new active voxels;
   d) using the processor removing in parallel operation duplicate active voxels;
   e) using the processor compacting in parallel operation the non-duplicate active voxels;
   f) using the processor repeating c) to e) until a quantitative stopping criterion is met;
   g) using the processor determining level set segmentation data in dependence upon the level set field, the segmentation data being indicative of a feature of the object; and,
   h) using the processor providing the level set segmentation data.

2. A method as defined in claim 1 wherein the new active voxels are determined corresponding to an intersection of active voxels changing in time and active voxels changing in space.

3. A method as defined in claim 1 comprising storing the active voxels in a plurality of auxiliary buffers.

4. A method as defined in claim 3 comprising compacting the plurality of auxiliary buffers.

5. A method as defined in claim 4 comprising producing a densely packed buffer of active voxels.

6. A method as defined in claim 5 wherein f) is performed until the densely packed buffer is void of active voxels.

7. A method as defined in claim 1 wherein a GPU processor is used.

8. A method as defined in claim 1 wherein the new active voxels are determined using a speed function based on a surface curvature of the level set field.

9. A method as defined in claim 1 wherein the quantitative stopping criterion is the number of active voxels being approximately zero.

10. A method as defined in claim 1 wherein the dataset is a volume dataset.

11. A method as defined in claim 10 wherein the dataset is produced from a medical imaging device.

12. A method comprising:
   a) using a processor initializing in parallel operation a level set field within a multi-dimensional dataset comprising a plurality of voxels, the multi-dimensional dataset being indicative of an object;
   b) using the processor generating in parallel operation an initial set of active voxels in dependence upon the initialized level set field;
   c) using the processor determining in parallel operation new active voxels corresponding to an intersection of active voxels changing in time and active voxels changing in space;
   d) using the processor removing in parallel operation duplicate active voxels;
   e) using the processor compacting in parallel operation the non-duplicate active voxels;
   f) using the processor repeating c) to e) until a quantitative stopping criterion is met;
   g) using the processor determining level set segmentation data in dependence upon the level set field, the segmentation data being indicative of a feature of the object; and,
   h) using the processor providing the level set segmentation data; and
   wherein steps b) to f) the active voxels are stored in a plurality of auxiliary buffers.

13. A method as defined in claim 12 comprising compacting the plurality of auxiliary buffers.

14. A method as defined in claim 13 comprising producing a densely packed buffer of active voxels.

15. A method as defined in claim 12 wherein a GPU processor is used.

16. A method as defined in claim 12 wherein the new active voxels are determined using a speed function based on a surface curvature of the level set field.

17. A method as defined in claim 12 wherein the quantitative stopping criterion is the number of active voxels being approximately zero.

18. A method as defined in claim 12 wherein the dataset is a volume dataset.

19. A method as defined in claim 18 wherein the dataset is produced from a medical imaging device.

20. A non-transitory storage medium having stored therein executable commands for execution on a processor, the processor when executing the commands performing:
- a) initializing in parallel operation a level set field within a multi-dimensional dataset comprising a plurality of voxels, the multi-dimensional dataset being indicative of an object;
- b) generating in parallel operation an initial set of active voxels in dependence upon the initialized level set field;
- c) determining in parallel operation new active voxels;
- d) removing in parallel operation duplicate active voxels;
- e) compacting in parallel operation the non-duplicate active voxels;
- f) repeating c) to e) until a quantitative stopping criterion is met;
- g) determining level set segmentation data in dependence upon the level set field, the segmentation data being indicative of a feature of the object; and,
- h) providing the level set segmentation data.

* * * * *